Oct. 31, 1961 G. H. USHER ET AL 3,006,644

MAGNETIC JUMP AND REACH BOARD

Filed Feb. 5, 1958

INVENTORS
GEORGE H. USHER
ARNOLD J. HISERMAN
BY
Paul Blivess
ATTORNEY

United States Patent Office 3,006,644
Patented Oct. 31, 1961

3,006,644
MAGNETIC JUMP AND REACH BOARD
George H. Usher, 1270 Spruance Road, and Arnold J. Hiserman, 12 Shady Lane, both of Monterey, Calif.
Filed Feb. 5, 1958, Ser. No. 713,337
5 Claims. (Cl. 272—59)

The magnetic jump and reach board is used to measure the "jump and reach test." This test is a physical performance test, used in many physical fitness standardized tests in the field of physical education.

The test is usually administered in the following fashion: the examinee, while standing flatfooted, marks his maximum vertical reach on a flat vertical surface by means of chalk, crayon, or pencil. The test next requires the examinee to jump vertically and at the same time, mark his maximum vertical reach at the highest point of his jump. The measured difference between the two marks made, constitute the examinee "jump and reach" performance score.

The magnetic jump and reach board consists of a metal backboard designed to contain a sliding metal scale, graduated in inches. This backboard is fixed to a vertical surface by means of rubber suction cups which are themselves fixed to the backboard by suction cups.

The sliding scale consists of a metal sheet with a spring catch attached about one inch from the extreme lower edge of the sheet. The scale is measured (in inches) from the catch to the upper edge of the sheet. The backboard is constructed so that the catch can engage in a row of holes drilled at one inch intervals in the metal backboard.

The jump and reach test, using the magnetic jump and reach board, is given in the following manner:

(1) The magnetic jump and reach board is attached to a vertical surface.

(2) The examinee stands flatfooted, grasping and disengaging the catch.

(3) Examinee, grasping catch, slides the scale upwards and engages the catch in the hole nearest his maximum reach.

(4) The examinee, holding a plastic enclosed magnet, jumps vertically and at the same time, places the magnet on the scale at his maximum vertical reach.

(5) The magnet's position on the metal scale indicates the "jump and reach" score.

Figure 1:
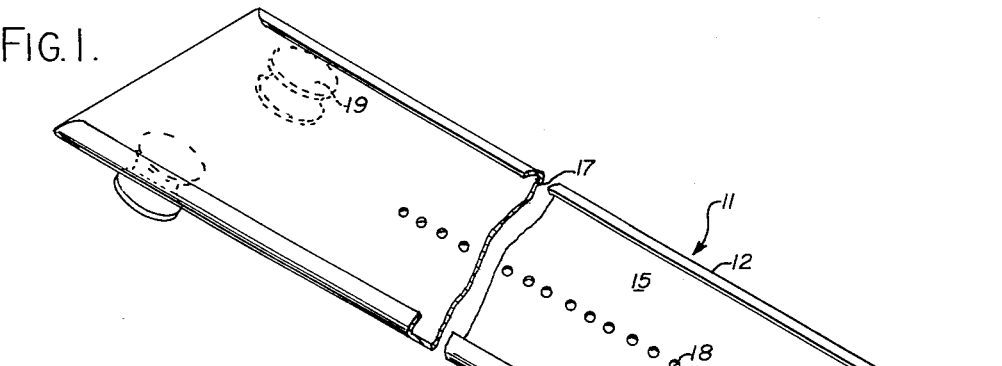
Figure 2:
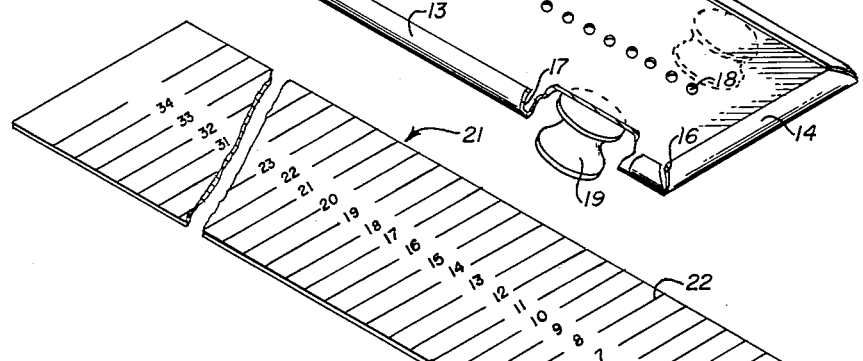
Figure 3:
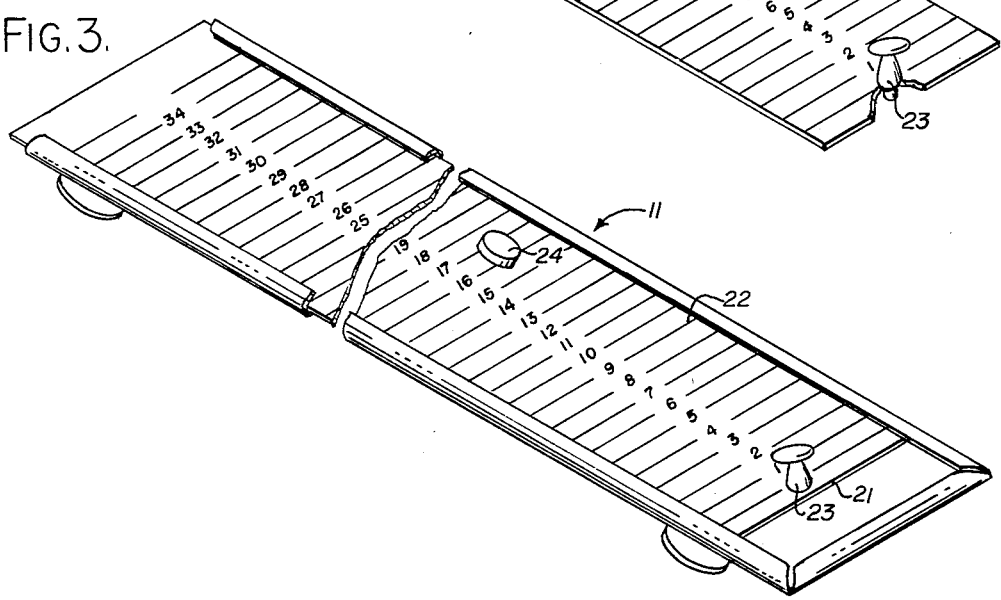

The magnetic jump and reach board is illustrated in the drawings, in which: FIGURE 1 is a perspective view of the backboard and FIGURE 2 of the scale. FIGURE 3 is a perspective drawing of the assembled parts of FIGURES 1 and 2, the complete device and the magnet added thereto.

The magnetic jump and reach board consists of two parts: A backboard 11 shown in FIGURE 1, and a scale, shown in FIGURE 2. The backboard 11 consists of a sheet of 24 gauge hot-rolled steel. Dimensions are: 36½" long by 13" wide. This steel is doubled-hemmed ½" on two sides, inturned side flanges 12, 13, and one end flange 14, or hem. This gives the backboard and its panel 15 the total dimensions of 36" long and 12" wide. The two corners, where side and end hems meet, are mitered 16. The clearance between panel 15 and hems 12, 13, 14 is ⅛" forming a groove 17. Twenty-four ¼" diameter holes 18 are drilled at 1" intervals starting 1" from the hemmed end 14, the lower end, and at a distance of 6" from each side flange 12, 13. A double suction cup 19 (one with a suction surface at each end) is used on and secured at each corner of the reverse side of the backboard 11.

The scale 21 consists of one sheet of 24 gauge hot-rolled steel, dimensions 35¹⁵⁄₁₆" by 11⅞" with its free face scaled by markings 22, straight lines 1" apart and numbered 0 to 34. The zero mark starts ¹⁵⁄₁₆" from the bottom edge of the sheet 21. A ½" spring-loaded catch 23 is fastened to the metal sheet on the zero mark of the scale and 5¹⁵⁄₁₆" from each side edge. The scale is inserted into the grooves 17 of the backboard. The catch 23 may be engaged in one of the lower of the holes 18 in the backboard. The suction cups 19 when attached to the reverse side of the backboard may be contacted to any vertical level surface (e.g.—wall), thus, the assembly is ready for use.

A magnet 24 is used to indicate a score on the scale. These may be plastic-enclosed magnets. The type of magnet used insures the placing of it on the scale, and eliminates the throwing of the magnet at the scale. This method of marking is superior to those methods using chalk, crayon, or pencil marking on a scale or surface.

The board can be placed in position quickly. Once placed it is ready for use. It can be used indefinitely without the necessity of having to erase previous marks made on the surface thereof or of having to change the surface medium. At the conclusion of the test the magnet indicates the score without the necessity of having to measure by tape or ruler.

The examiner need only read and record scores. The examinee is easily able to return the scale to its original position and retrieve the magnet.

Having thus described our invention, its construction and use, we claim:

1. A jump and reach board, comprising: a backboard, a sliding iron scale having a face opposed to said backboard and a free face away from said board, guide means holding said scale adjacent said board and guiding one for relative movement with respect to the other, retaining means secured and acting between said board and scale to limit such movement after a manual relative positioning of said board and scale, graduations on the free face of and along said scale, a handle secured to said scale adjacent one end of said graduations, means for supporting said board in a vertical position, and a magnet for selectively marking said graduations by adhering to said scale.

2. The combination of claim 1 in which said retaining means and said handle are a unitary structure located at said zero position.

3. The combination of claim 1 in which said graduations are numbered from 1 to 24 in one inch steps, and with a zero position preceding the one graduation by one step; and with said handle being located at said zero position.

4. The combination of claim 3 in which said retaining means and said handle are a unitary structure located at said zero position.

5. A jump and reach board, comprising: a flat back board formed from a rectangular sheet of iron, opposed longitudinal edges of said board being folded inwardly of said edges to form a guide slot adjacent each such edge, a scale in the form of a rectangular sheet of iron substantially coextensive with said board and with its longitudinal edges received in said guide slots, said scale having a face in opposition to said board and a free face away from said board, graduations on the free face of and longitudinally of said scale, a handle secured to said scale adjacent one end of said graduations, retaining means secured and acting between said board and scale to limit such movement after a manual relative positioning of said board and scale, means for supporting said board in a vertical position, and a magnet for selectively marking said graduations by adhering to said scale.

References Cited in the file of this patent

UNITED STATES PATENTS

| | | |
|---|---|---|
| 1,842,662 | Devlin | Jan. 26, 1932 |
| 2,330,951 | Burmester et al. | Oct. 5, 1943 |
| 2,676,086 | Wales | Apr. 20, 1954 |
| 2,722,754 | Slote | Nov. 8, 1955 |